US006819911B2

(12) United States Patent
Clelland et al.

(10) Patent No.: US 6,819,911 B2
(45) Date of Patent: Nov. 16, 2004

(54) ACTIVE INTERFERENCE SUPPRESSOR UTILIZING RECOMBINANT TRANSMULTIPLEXING

(75) Inventors: Eric J. Clelland, Tempe, AZ (US); Kenneth S. Wreschner, Chandler, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 685 days.

(21) Appl. No.: 09/822,149

(22) Filed: Apr. 2, 2001

(65) Prior Publication Data

US 2002/0142725 A1 Oct. 3, 2002

(51) Int. Cl.[7] .............................. H04B 1/10; H04B 15/00
(52) U.S. Cl. ..................................... 455/296; 455/63.1
(58) Field of Search ............................... 455/296, 63.1, 455/276.1, 278.1, 283, 284, 295, 234.1, 232.1, 242.1, 242.2

(56) References Cited

U.S. PATENT DOCUMENTS

| | | | | |
|---|---|---|---|---|
| 4,434,505 A | * | 2/1984 | Gutleber ..................... 455/501 |
| 4,952,193 A | * | 8/1990 | Talwar ....................... 455/63.1 |
| 4,989,262 A | | 1/1991 | Saito ........................... 455/138 |
| 5,170,489 A | * | 12/1992 | Glazebrook ................ 455/63.1 |
| 5,410,750 A | | 4/1995 | Cantwell et al. ............ 455/306 |
| 5,493,717 A | * | 2/1996 | Schwarz ...................... 455/306 |
| 5,524,125 A | | 6/1996 | Tsujimoto ................... 375/347 |
| 6,002,727 A | * | 12/1999 | Uesugi ........................ 375/346 |
| 6,032,026 A | * | 2/2000 | Seki et al. .................. 455/63.1 |
| 6,075,980 A | * | 6/2000 | Scheck ........................ 455/324 |
| 6,285,861 B1 | * | 9/2001 | Bonaccorso et al. ........ 455/137 |
| 6,570,864 B1 | * | 5/2003 | Kim et al. ................... 370/342 |
| 6,580,771 B2 | * | 6/2003 | Kenney ....................... 375/346 |
| 6,606,347 B1 | * | 8/2003 | Ishii ............................ 375/144 |
| 2002/0123308 A1 | * | 9/2002 | Feltstrom ..................... 455/63 |

OTHER PUBLICATIONS

"Modified DFT Filter Banks with Perfect Reconstruction" by Tanja Karp, and N.J. Fliege, IEEE Transactions on Circuits and Systems–II: Analog and Digital Signal Processing, vol. 46, No. 11, Nov. 1999, pp. 1404–1414.

* cited by examiner

Primary Examiner—Vivian Chin
Assistant Examiner—Raymond Persino
(74) Attorney, Agent, or Firm—Jenner & Block LLP

(57) ABSTRACT

An active signal suppression system utilizes multi-rate recombinant transmultiplexer (56) to suppress or cancel an undesired signal (46) from a wideband composite signal (40) to be applied to an analog to digital converter (20). The transmultiplexer (56) includes a first demultiplexer (88,90), multiplier (100), switch (120), and multiplexer (128,130). The demultiplexer and multiplexer each have a poly phase filter and Fast Fourier Transform pair which permit channelization and facilitate the generation of a cancellation signal (145) for suppression of the undesired signal. Signal cancellation circuit (60) receives the composite signal (40) at one input (70) and the cancellation signal (145) at another input (76). A minimum mean square estimation circuit (MMSE) (158) and a second demultiplexer (145, 146) are included in a feedback circuit to provide error correction. A detector and automatic gain control circuit (138) is coupled to the first demultiplexer (88,90) and the multiplier (100) to detect the undesired signal (46) for controlling the switch and to provide automatic gain control to a variable gain amplifier (214) connected to the signal cancellation circuit.

21 Claims, 2 Drawing Sheets

ACTIVE INTERFERENCE SUPPRESSOR UTILIZING RECOMBINANT TRANSMULTIPLEXING

FIELD OF THE INVENTION

The invention relates generally to communication apparatus and, more particularly, to such apparatus including systems for the active suppression of undesired signals.

BACKGROUND OF THE INVENTION

Modern communication and signal collection systems include wideband analog-to-digital (A to D) converters for changing a converted version of a transmitted analog signal into a digital signal to facilitate digital processing thereof. Such A to D converters can only handle a predetermined amount of total signal input power before they go into saturation and begin clipping the time domain signal thereby resulting in undesirable spectral content in the output signal of the converter. Thus strong undesirable Signals Not Of Interest (SNOI's) tend to undesirably capture the dynamic range of such A to D converters. This effect suppresses the detection capability for the (Signals of Interest) SOI's that are weaker in power. Such SOI's may be of unknown frequency offset with respect to the SNOI's. Thus this problem can be particularly acute in wideband systems receiving SNOI's of large magnitudes. Such SNOI's can have known characteristics such as frequency or modulation type, for example.

There are several analog and digital prior art systems which address the foregoing problem by suppressing the magnitude of such SNOI's to result in an increase in the relative magnitude of the SOI's applied to the system A to D converter. Some of these prior art analog systems employ complex phased array antenna systems or tunable notch filters. An exemplary prior art solution using multiple antennas is disclosed in U.S. Pat. No. 4,989,262 issued to Saito on Jan. 29, 1991 and another prior art solution showing a plurality of filters is disclosed in U.S. Pat. No. 5,524,125 issued to Tsujimoto on Jun. 4, 1996, the entire contents of each of which are hereby incorporated herein by reference.

Since the SNOI's can be at any frequency in the selected band or have any modulation characteristic, some prior art targeted coherency systems require complex demodulators and remodulators unique to each form of modulation to be cancelled. Still other prior art digital approaches rely on simple Fast Fourier Transform (FFT) bin or channel excising which doesn't provide the degree of selective discrimination required for some applications. All of the above problems with the prior art solutions makes them expensive and difficult to implement and otherwise unsuitable for many applications.

Therefore, there is a need for an interference or SNOI suppression system which is capable of operating with a single simple antenna and which doesn't require targeted coherency and tracking techniques or notch filters. There is also a need for a SNOI suppression system that is essentially modulation independent and that is capable of highly selective discrimination. A further need is to provide a SNOI suppression system that also provides automatic gain control (AGC).

DETAILED DESCRIPTION OF A PREFERRED EMBODIMENT

The present invention relates to a interference suppressor systems for actively suppressing or canceling SNOI's prior to a primary or main system A to D converter that changes a received analog signal into a digital signal for processing. The suppressor system utilizes multiplexers and demultiplexers to provide a transmultiplexer. More specifically, a "multiplexer" is defined as a device that allows the transmission of multiple data streams through a common medium such as a single time domain signal, for instance. Several communications paths or channels may be either permanently or dynamically included in the single signal to accomplish this result. A "demultiplexer" is defined as a device utilized to break the single time domain signal into a plurality of frequency domain channels having different center frequencies. A transmultiplexer as will be described herein, separates or "demultiplexes" the single time domain signal into several frequency domain channels, selectively processes various selected ones of these channels and then "multiplexes" or recombines the channels back into a single signal which is used for suppression of SNOI's. The transmultiplexer of the described embodiment also provides an automatic gain control (AGC) signal for controlling an AGC circuit to optimize system performance.

Figure 1:
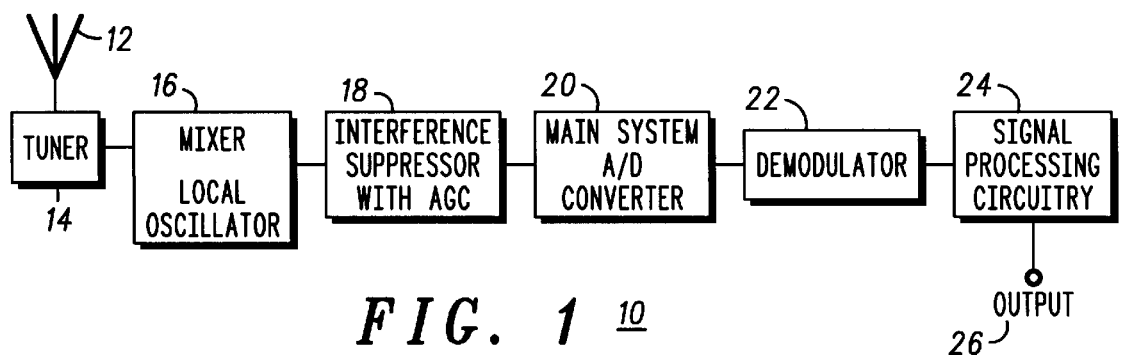
FIG. 1 is a block diagram illustrating a wireless communication or signal collection apparatus that includes an interference suppressor.

More specifically, FIG. 1 shows a block diagram of a communication or signal processing system or apparatus 10 having an antenna 12 coupled through tuner 14 and mixer/local oscillator 16 to suppressor system 18. Suppressor system 18 enables antenna 12 to be a simple antenna as opposed to a complex prior art antenna array. Antenna 12 is adapted to receive a wide spectrum of multiplexed signals and to apply such signals to tuner 14. Tuner 14 tunes or selects a desired band of signals and mixer 16 translates the selected band to a base band for providing an analog input signal to interference suppressor 18.

Main or primary system wide band A to D 20 receives the modified version of the analog band pass signal from suppressor 18 having SNOI's attenuated. This increases the relative magnitude of the SOI's that are applied in digital form to demodulator 22 which provides the SOI's to signal processing circuit 24. The operation of demodulator 22 and signal processing circuit 24 are thereby enhanced because they can operate on SOI's having greater relative magnitudes than otherwise would be the case if suppressor circuit 18 was not included which thereby increases the sensitivity of A to D converter 20 to SOI's. Output 26 can be connected to either a display, a computer or a loudspeaker or some other output device that receives and utilizes the captured SOI's of circuit 24.

Figure 2:
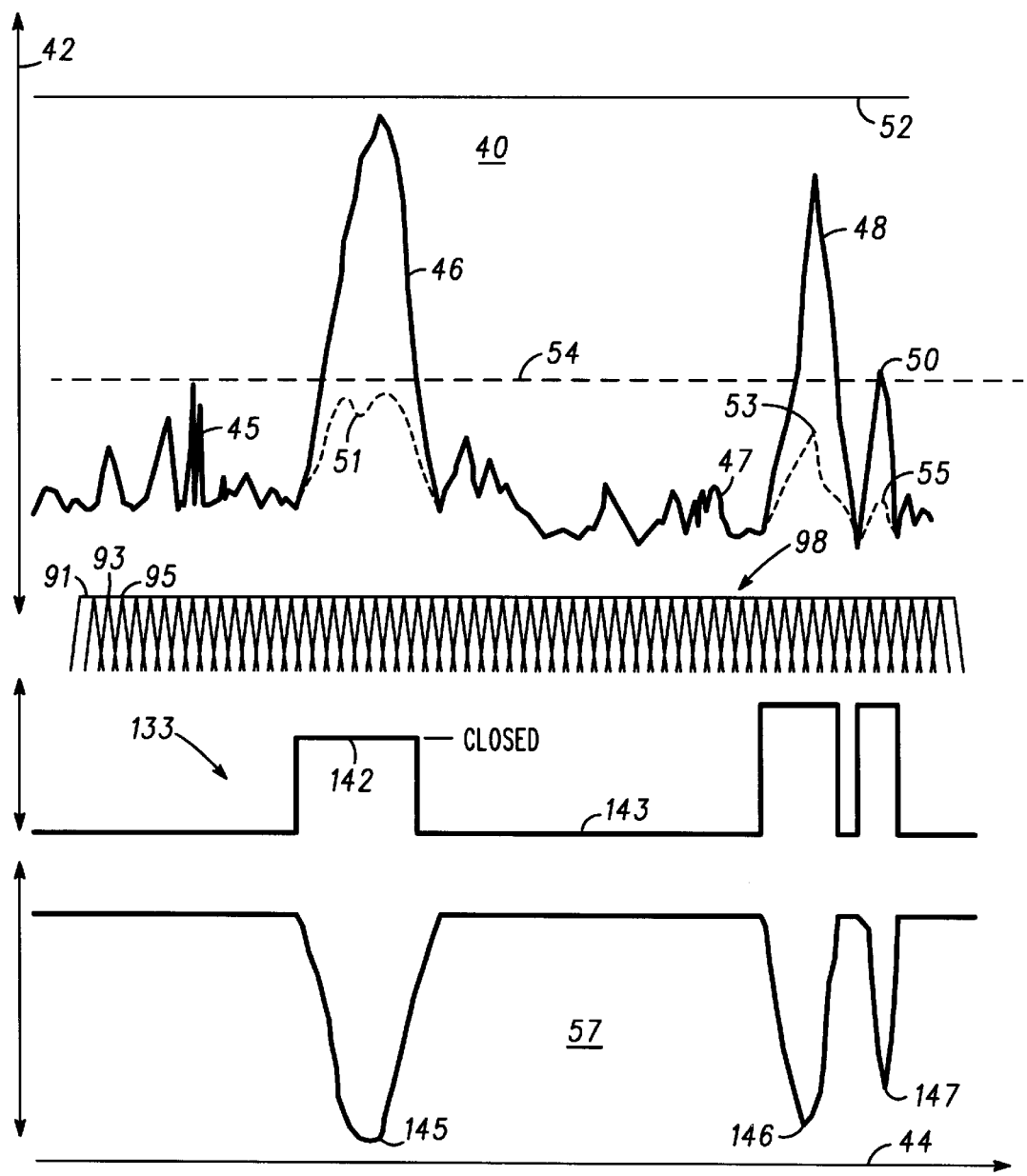
FIG. 2 show a plurality of waveforms for illustrating the operation of the interference suppressor of one embodiment of the present invention.

FIG. 2 shows multiplexed, single signal, base band waveform 40 that is applied by mixer 16 to the input of suppressor 18. The power of signal 40 is plotted along ordinate axis 42 of FIG. 2 and the frequency of signal 40 is plotted along abscissa axis 44. For purposes of illustration, the composite signal 40 includes SOI's 45 and 47 and SNOI's 46, 48 and 50. As previously pointed out SNOI's 46, 48 and 50 can have any type of modulation and be at any frequency within the base band thereby making prior art targeted coherent cancellation approaches expensive and difficult to implement. If signal 40 was applied directly to main system A to D connector 20 the level of operation of A to D 20 would have to be at or near level 52 to avoid clipping SNOI 46. Such clipping shall be avoided because it would cause undesired spectral results in the output signal of A to D 20. The level of operation 52 would make it difficult for A to D converter 20 to detect SOI's 45 and 47 which are of weaker power and of unknown relationship to SNOI's 40, 48 and 50. The purpose of suppressor 18 is to lower or suppresses the magnitude of SNOI's 46, 48 and 50 to form residual SNOI's 51, 53 and 55 which have magnitudes below level 54 thereby increasing the relative magnitude of SOI's 45 and 47 to residual SNOI's 51, 53 and 55. AGC is utilized to operate A to D 20 at level 54 in a manner to be explained.

Figure 3:
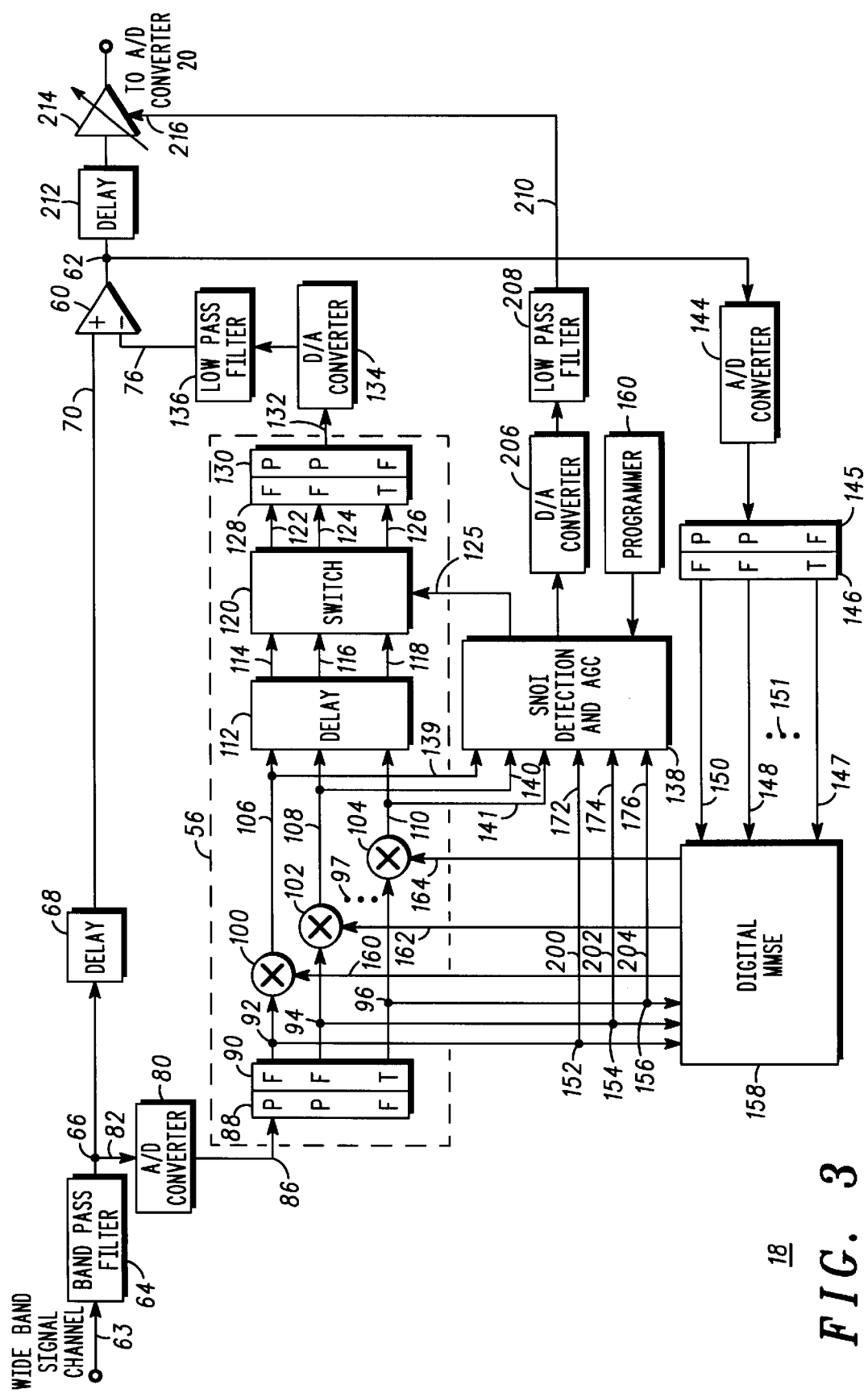
FIG. 3 shows a block diagram of the interference suppressor and automatic gain control of one embodiment of the present invention.

FIG. 3 shows a block diagram of an embodiment of suppressor 18 for the adaptive removal or suppression of strong signal interference signals such as SNOI's 46, 48 and 50 within base band channel. Suppressor 18 utilizes transmultiplexer 56 having recombinant polyphase channelization. Active interference cancellation signals 57 of FIG. 2 are applied along with delayed baseband signal 40 to signal cancellation circuit 60 prior to A to D 20. Error signals are fed back from the output 62 of circuit 60 to control transmultiplexer 56 to provide fine adjustment of cancellation signals 57.

More particularly, wideband signal 40 is applied to the input 63 of bandpass filter 64. The output terminal 66 of bandpass filter 64 is connected through a first path including delay circuit 68 to the positive or noninverting input terminal 70 of signal cancellation circuit 60. Thus a delayed version of the wideband input signal 40 is applied to cancellation circuit 60 through the first path. Signal cancellation circuit 60 may be an operational amplifier comparator.

Another or second signal path is provided from the output terminal 66 of bandpass filter 64 to an inverting or negative input terminal 76 of signal cancellation circuit 60. This second path includes A to D converter 80 that has an input 82 connected to terminal 66 and an output terminal connected to the input terminal 86 of an analysis poly phase filter (PPF) 88 which is coupled to Fast Fourier Transform circuit (FFT) 90. The demultiplexer including PPF 88 and FFT 90 forms the first half of a perfect recombination filter bank. PPF 88 and FFT 90 responds to the multiplexed digital signal at terminal 86 to provide demultiplexed, channelized output signals at junctions 92, 94, through 96 or "N" in a known manner. Dots 97 symbolize that there can be any desired number "N" of channelized output junctions 92, 94, and 96. A plurality of such channels 91, 93, 95 each having a known center frequency is illustrated by band pass frequency graph 98 of FIG. 2.

Multipliers 100, 102, and 104 respectively couple junctions 92, 94, and 96 to input terminals 106, 108, and 110 of delay circuit 112. The delayed, channelized output signals from delay circuit 112 are respectively coupled through conductors 114, 116, and 118 to the input terminals of switch 120. The output terminals of switch 120 are coupled through lines 122, 124, and 126 to the input terminals of FFT 128 that is paired with PPF 130 having an output terminal 132. FFT 128 and PPF 130 form a synthesis multiplexer and the second half of the perfect recombination filter bank. Switch 120 includes individual switches in series in each channel to connect or disconnect each channel to FFT 128 in response to control signal 133 that is shown in FIG. 2, and applied to switch control terminal 125.

The circuitry 56 in the above described path from input terminal 86 of PPF 88 to output terminal 132 of PPF 130 functions as a transmultiplexer including perfect recombination filter bank pairs 88, 90 and 128, 130 which operate in a known manner such as that is described in the article entitled "Modified DFT Filter Banks with Perfect Reconstruction", IEEE Transactions on Circuits and Systems-II: Analog and Digital Signal Processing, Volume 46, Number 11, November 1999, Pages 1404–1414, which is incorporated herein in its entirety by reference.

More particularly, in operation transmultiplexer 56 demultiplexes time domain digital input signals on terminal 86 into the channelized frequency domain signals that are applied as input terminals to multipliers 100, 102 and 104. The outputs of the multipliers are processed by switch 120 and multiplexed back from the frequency domain into the time domain by FFT 128 and PPF 130 and applied to the digital-to-analog (D to A) converter 134. Low pass filter 136 connects the output of D to A converter 134 to inverting input terminal 76 of signal cancellation circuit 60.

SNOI detector circuit 138 has a first set of inputs connected through lines 139, 140, and 141 to the outputs of respective multipliers 100, 102 and 104. SNOI detector circuit 138 responds to the multiplier output signals to provide control signal 133 of FIG. 2 to selectively operate the switches in switch 120 to excise or remove the channelized signals which do not contain interference or SNOI's and pass only those channels which do contain interference. Detector circuit 138 can be controlled by programmer 160 to enable the selection of SNOI's of known characteristics such as frequency or modulation type. For instance, selected switches in switch 120 close in response to level 142 of waveform 133 to pass a version of SNOI 46, and close in response to level 143 to block SOI 47. The versions of SNOI's or interference channels are then further applied by synthesis multipleplexer FFT 128 and PPF 130, D to A 134, and low pass filter 136 to thus apply a signal to inverting input 76 of comparator 60 which when inverted by comparator 60 provides cancellation signal 57 of FIG. 2. The delay of the first signal path including delay 68 is approximately equal to the delay of the second path from terminal 66 to terminal 76 which includes delay 112 so that peaks 145, 146 and 147 of cancellation signal 57 developed by comparator 60 can respectively cancel or suppress respective peaks 46, 48 and 50 of waveform 40 in comparator 60 to provide residual SNOI's 51, 53 and 55 at output 62 of comparator 60.

To further aid the above cancellation process, the output 62 of comparator 60 is fed back through A to D converter 144, PPF 145, and FFT 146 to provide a set of demultiplexed, channellized feedback signals through lines 147, 148 and 150. A to D converter 144 is sampled at the same rate and has the same full scale level as A to D converter 80. Dots 151 again indicate there can be "N" such channels. PPF 145 and FFP 146 form a perfect recombination filter bank identical to PPF 88 and FFT 90. Thus outputs of FFT 146 provide one set of inputs to digital Minimum Mean Square Estimation (MMSE) equalizer block 158. Another set of inputs through junctions 152, 154 and 156 for MMSE 158 come from FFT 90 through junctions 92, 94 and 96. MMSE 158 computes error signals by comparing the signals from the outputs of FFT's 90 and 146 to provides multiplier control signals through lines 160, 162, and 164 to the control terminals of multipliers 100, 102, and 104 to correct the channelized data in the multiplier. MMSE block 158 utilizes a statistical algorithm in a known manner to provide equalization. The corrected channelized data from complex multiplier bank 100, 102 and 104 is delayed by a predetermined amount by delay circuit 112 and then applied to switch 120. Thus, the channelized outputs of FFT 90 are processed through the multiplier bank 100, 102 and 104 which applies phase and amplitude error correction thereto. This feedback process provide phase coherency between the delayed input 40 and cancellation signal 57.

The AGC block of SNOI control circuit 138 has inputs coupled through lines 200, 202 and 204 to receive the pre-corrected bin or channels from the outputs of FFT 90. The AGC block also receives corrected bins or channels through lines 139, 140 and 144. AGC block 138 subtracts the power levels of the corrected signal waveform 40 with SNOI's suppressed to 51, 53 and 55 from the uncorrected signal, for example waveform 40, to provide a digital AGC signal through D to A converter 206 which is filtered by low pass filter 208 to provide an analog AGC signal on output line 210. Delay circuit 212 couples the output of cancellation circuit 60 to the input of Variable Gain Amplifier (VGA) 214 that has a control terminal 216 which is connected to line 210. VGA 214 responds to the AGC signal from low pass filter 208 to adjust the level of the signal applied to system analog-to-digital converter 20 from level 52 to level 54 of FIG. 2, for instance. Thus primary A to D converter 20 is optimally loaded as indicated by level 54 in FIG. 2 so that A to D 20 can extract the lower power SOI's 45 and 47 and apply them to signal processing circuit 24.

Thus, suppressor circuit 18 uses adaptive digital signal processing approaches in concert with wideband polyphase channelization and perfect signal reconstruction to generate multiple cancellation signals 145, 146 and 147. The prior art utilizes more expensive analog filter banks and notch filters or analog demodulator and re-modulator approaches. Suppressor circuit 18 also has the added benefit of being able to actively regenerate interference cancellation signals 145, 146 and 147 of arbitrary modulation without requiring a prior art coherent acquisition and tracking system, which requires multiple, complex demodulator and re-modulator designs unique to each type of modulation format to be cancelled. Suppressor circuit 18 uses a non-coherent approach which produces a nearly perfect cancellation waveform 57 (to within some minimal reconstruction error) that is essentially modulation independent. Existing prior art analog interference cancellation systems often use either tunable notch filters or demodulation and re-modulation systems and the other digital approaches some of which rely on simple FFT bin excising without the fine selective discrimination provided by transmultiplexer 56 having polyphase channelizer with its perfect recombination features.

Although the present invention has been described in conjunction with a preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A signal suppression system having an input and an output, a composite signal having desired and undesired signal components being applied to the input, the signal suppression system being adapted to provide an output signal at the output thereof with the undesired component suppressed therein, the signal suppression system including in combination:

signal cancellation means having inverting and non-inverting inputs and an output;

a first path between the input of the signal suppression system and said signal cancellation means, said first path providing said composite signal to one of said inverting and non-inverting inputs; and a second path between the input of the signal suppression system and the other of said inverting and non-inverting inputs of said signal cancellation means, said second path including a transmultiplexer means, said transmultiplexer means being adapted to respond to the undesired component to provide a cancellation signal to said other of said inverting and non-inverting inputs of said signal cancellation means so that said signal cancellation means can suppress said undesired component in the output signal thereof, wherein said transmultiplexer means includes:

first demultiplexer means for separating said composite signal into channelized signals at multiple outputs thereof;

undesired signal detector means adapted to sense the undesired signal component, said undesired signal detector means being coupled to said first demultiplexer means and providing a timing signal in response to the undesired signal component;

switch means having input, output and control terminals, said input terminal of said switch means being coupled to said first demultiplexer means, said control terminal of said switch means being coupled to said detector means, said switch means being responsive to said timing signal to conduct said cancellation signal to said output terminal thereof; and multiplexer means coupling said output terminal of said switch means to said signal cancellation means, wherein said first demultiplexer means includes a first poly phase filter means coupled through a first Fast Fourier Transform means, said first demultiplexer means thereby being adapted to separate said input signal into a plurality of channelized signals having known center frequencies; and said multiplexer means includes a second Fast Fourier Transform means coupled through a second poly phase filter means, said multiplexer means combining said plurality of channelized signals into a single cancellation signal representing the undesired signal component.

2. The signal suppression system of claim 1 wherein:

said transmultiplexer means provides a predetermined amount of delay to said cancellation signal; and said first path includes delay means for delaying the composite signal by approximately said predetermined amount so that said signal cancellation means can utilize said cancellation signal to suppress the magnitude of the undesired component.

3. The signal suppression system of claim 1 wherein:

said transmultiplexer means includes multiplier means having at least one control terminal; and the signal suppression system further includes feedback circuit means coupled between said output of the signal cancellation means and said control terminal of the multiplier means, said feedback circuit means enabling said multiplier means to fine tune said cancellation signal to optimize the suppression of the undesired signal.

4. The signal suppression system of claim 1 further including:

multiplier means coupled between said first demultiplexer and said multiplexer;

a feedback circuit connected from the output of said signal cancellation means to said multiplier means; said feedback circuit having:

a second demultiplexer means having a third poly phase filter means coupled through a third Fast Fourier Transform means; and digital minimum mean square estimation means coupled between said first demultiplexer means, said second demultiplexer means and said multiplier means, said digital minimum mean square estimation means, enabling said multiplier means to provide adjustments to said cancellation signal.

5. The signal suppression system of claim 4 further including:

variable gain means coupled to the output of said cancellation means, said variable gain means having a control terminal for receiving a gain control signal;

said detector means providing said gain control signal; and first means coupling said detector means to said control terminal of said variable gain means.

6. The signal suppression system of claim 5 wherein said first means includes digital to analog converter means and low pass filter means.

7. An active signal suppression system having an input and an output, a composite signal having desired and undesired components being applied to the input, the signal suppression system being adapted to suppress the undesired component, the signal suppression system including in combination:

signal cancellation means having inverting and non-inverting inputs and an output;

a first path between the input of the signal suppression system and said signal cancellation means; said first path providing said composite signal to one of said inverting and non-inverting inputs;

a second path between the input of the suppression system and the other of said inverting and non-inverting inputs of said cancellation means, said second path including a series arrangement of first circuit means providing said composite signal, demultiplexer means having an input coupled to said first circuit means and having an output including said composite signal, switch means having a control terminal, multiplexer means and second circuit means;

detector means coupled to receive said output of said demultiplexer means; said detector means being responsive to the existence of said undesired components to provide a control signal to said switch means so that said switch means is responsive to the undesired component to provide a cancellation signal through said multiplexer means and said second circuit means to said other of said inverting and non-inverting inputs of said signal cancellation means so that said signal cancellation means can suppress said undesired signal, wherein said demultiplexer means includes poly phase filter means coupled through a Fast Fourier Transform means, said demultiplexer means thereby being adapted to separate said input signal into a plurality of channelized signals having known center frequencies; and said multiplexer means includes a Fast Fourier Transform means coupled through a poly phase filter means for combining said plurality of channelized signals into a single signal representing the undesired component.

8. The signal suppression system of claim 7 wherein said second path provides a predetermined amount of delay to said cancellation signal; and said first path includes delay means providing a delay to the composite signal which is approximately equal to said predetermined amount of delay so that said composite signal and said cancellation signal are applied to said inputs of said signal cancellation means at approximately the same time so that said cancellation signal can suppress the magnitude of said undesired component.

9. The signal suppression system of claim 8 wherein said first circuit means includes an analog to digital converter.

10. The signal suppression system of claim 7 wherein said second circuit means includes a digital to analog converter and a low pass filter means.

11. The signal suppression system of claim 7 wherein said second path further includes a multiplier means, and feedback means from the output of the signal cancellation means to said multiplier means to provide adjustments to said cancellation signal.

12. The signal suppression system of claim 7 further including:

variable gain means coupled to the output of said signal cancellation means, said variable gain means having a control terminal for receiving a gain control signal;

said detector means providing said gain control signal; and first means coupling said detector means to said control terminal of said variable gain means.

13. An active signal suppression system having an input and an output, a composite signal having desired and undesired components being applied to the input, the signal suppression system being adapted to suppress the undesired component, the signal suppression system including in combination:

signal cancellation means having inverting and non-inverting inputs and an output;

a first path between the input of the signal suppression system and said signal cancellation means; said first path providing said composite signal to one of said inverting and non-inverting inputs;

a second path between the input of the suppression system and the other of said inverting and non-inverting inputs of said cancellation means, said second path including a series arrangement of first circuit means providing said composite signal, demultiplexer means having an input coupled to said first circuit means and having an output including said composite signal, switch means having a control terminal, multiplexer means and second circuit means, wherein said second path further includes a multiplier means and feedback means from the output of the signal cancellation means to said multiplier means to provide adjustments to said cancellation signal; and detector means coupled to receive said output of said demultiplexer means; said detector means being responsive to the existence of said undesired components to provide a control signal to said switch means so that said switch means is responsive to the undesired component to provide a cancellation signal through said multiplexer means and said second circuit means to said other of said inverting and non-inverting inputs of said signal cancellation means so that said cancellation means can suppress said undesired signal, wherein said feedback circuit means includes:

a second demultiplexer having a poly phase filter means coupled to a Fast Fourier Transform means; and digital minimum mean square estimation means coupled between said first demultiplexer, said signal cancellation means and said multiplier means, said estimation means providing error correction signals to said multiplier means.

14. The signal suppression system of claim 13 wherein said second path provides a predetermined amount of delay to said cancellation signal; and said first path includes delay means providing a delay to the composite signal which is approximately equal to said predetermined amount of delay so that said composite signal and said cancellation signal are applied to said inputs of said signal cancellation means at approximately the same time so that said cancellation signal can suppress the magnitude of said undesired component.

15. The signal suppression system of claim 14 wherein said first circuit means includes an analog to digital converter.

16. The signal suppression system of claim 13 wherein said second circuit means includes a digital to analog converter and a low pass filter means.

17. The signal suppression system of claim 13 further including:

variable gain means coupled to the output of said signal cancellation means, said variable gain means having a control terminal for receiving a gain control signal;

said detector means providing said gain control signal; and first means coupling said detector means to said control terminal of said variable gain means.

18. An active wideband signal suppression system for canceling an undesired component from a composite signal having desired and undesired components, the suppression system including in combination:

signal cancellation circuit having inputs and an output;

first circuit means for applying said composite signal to one of said inputs of said signal cancellation means;

transmultiplexer in a series path coupled to another input of said signal cancellation circuit, said transmultiplexer having a first demultiplexer, a multiplier; a switch, and a multiplexer;

detector means coupled between said multiplier means and said switch, said detector means providing control signals to enable said transmultiplexer to provide a cancellation signal to said another input; and a feedback path from said output of said signal cancellation circuit to said multiplier; said feedback path including a second demultiplexer and a minimum mean square estimation circuit for providing a feedback signal which fine tunes the output of the multiplier to optimize said cancellation signal.

19. The suppression system of claim 18 wherein said first and second demultiplexers and said multiplexer each include a poly phase filter and Fast Fourier Transform circuit.

20. The suppression system of claim 18 further including an automatic gain control having:

a gain control circuit connected to said output of said signal cancellation circuit; and automatic gain control circuitry coupled to said first demultiplexer and to said multiplier for subtracting the output of said first demultiplexer and said multiplier to provide a gain control signal; and signal means coupling said gain control signal to said gain control circuit.

21. The suppression system of claim 20 wherein said circuit means includes an digital to analog converter.

* * * * *